3,211,549
ADDITIONAL ALLOYS FOR WELDING AND STEEL MAKING
Kazuji Kusaka, Fujisawa, Kanagawa Prefecture, Japan, assignor of one-half to Yawata Iron & Steel Co., Ltd., Tokyo, Japan, a corporation of Japan
No Drawing. Filed Dec. 21, 1961, Ser. No. 161,252
Claims priority, application Japan, Dec. 26, 1960, 35/50,142
4 Claims. (Cl. 75—134)

An arc electrode of either carbon steel or alloy steel coated with a flux has been used in welding or has been used with a flux in submerged are welding.

The present invention relates to a new ferro alloy containing rare earth metals, and more particularly to an addition alloy for the flux of a coated arc electrode and for steel-making.

The use of a flux according to the present invention in welding provides the advantages that a weld deposit obtained by using this flux will contain few gases and non-metallic inclusions, and a deposited metal of a high quality can be obtained which is particularly distinguished by a good Charpy value at a low temperature.

The coating materials so far known are mostly such inorganic substances as illuminite, rutile, quartz, calcium carbonate $CaCO_3$, manganese dioxide $MnO_2$ and talc which are applied by using a sodium silicate solution as a binding material.

Such ferro-alloys as Fe-Si and Fe-Mn have been used and mixed into the materials described above, but they are so low in deoxidization effect that the effect of their addition is small.

The present invention is a result of a study of the use as a flux of ferro-alloy containing rare earth metals which have stronger deoxidization and desulphurization effects than Fe-Mn and Fe-Si and which will be effective even if the metals remain in the deposited metal.

There has already been a case wherein a rare earth metal oxide was mixed in the flux for stainless steel. However, it is unthinkable that such oxide will be reduced to the metal and will have deoxidization and desulphurization effects.

It is also generally known to attempt to improve the quality of steel by adding a small amount of misch metal, that is, an alloy derived from a mixture of cerium earths. The misch metal is so difficult to pulverize and its melting point of 700° C. is so different from that of steel that it is not practical to use the misch metal for the flux for electrodes.

The present invention comprises making a ferro-alloy containing rare earth metals of melting points higher than 1100° C. or melting at temperatures higher by more than 400° C. than the melting point of the misch metal.

The object of the present invention is to provide a ferro-alloy containing rare earth metals so that by adding the ferro-alloy to a flux of a coated arc electrode, there can be obtained a deposited metal of high quality in welding steel, the deposited metal having a low sulphur content and few non-metallic inclusions.

Another object of the present invention is to provide a ferro-alloy containing rare earth metals so that by adding the same to a flux of a coated arc electrode, the deposited metal can be purified.

Other object of the present invention is to provide a ferro-alloy containing rare earth metals so that by adding the same to a molten high carbon steel there can be produced a nodular graphitic steel.

By adding rare earth metal halides to a Ca-Si alloy and causing them to react at high temperature, ferro-alloys of the following compositions have been obtained:

|    | Wt. percent |
|---|---|
| Fe | 3–15 |
| R | 7–45 |
| Ca | 2–25 |
| Si, balance. | | where R is a rare earth element or a mixture of rare earth elements.

The rare earth metal (R) added in making the aforesaid R-Ca-Si-Fe alloy consists of cerium, lanthanum, praseodymium, neodymium, and samarium and mixtures thereof. Specifically, the compositions of the alloy is as follows:

|    | Percent |
|---|---|
| Fe | 3 to 15 |
| Ce | 12 to 20 |
| La | 7 to 15 |
| Di [1] | 8 to 10 |
| Ca | 2 to 25 |
| Si, balance. | |

[1] Di=Pr+Nd+Sm.

This alloy is a ferro-alloy stable even at the room temperature.

It has a melting point of about 1200° C. and can be easily powdered by means of a crusher. This alloy has not only the property of removing oxygen and sulphur from molten iron and steel even when only 0.2% of it is used but also an ability to purify the deposited metal and an effect of depositing graphite of high carbon steel. When it is to be added to the flux for electrodes, 1 to 10% of the powdered alloy may be mixed into the other coating material and may be applied as the coating.

In case a sodium silicate solution is to be used in the coating material, an alloy having a Ca content as low as possible such as, for example, of 32% R, 4% Ca and 10% Fe, the balance being Si, may be used, because, if the amount of Ca is high, it will be likely to react with sodium silicate to produce bubbles.

When the analyses of the five elements of a metal deposited by using an electrode of mild steel coated with a $CaCO_3$ series flux in which 0 to 5% of this alloy had been mixed and the Charpy values thereof at —20° C. were investigated, the results were as follows:

| Amount of ferro-alloy of present invention in percent by weight | Analyses of deposit metal in percent by weight | | | | | Charpy Values (−20° C.) kg.m./cm.² V-Notch-Test piece |
|---|---|---|---|---|---|---|
| | C | Si | Mn | P | S | |
| 0 | 0.08 | 0.18 | 0.54 | 0.018 | 0.019 | 8 |
| 1 | 0.07 | 0.18 | 0.56 | 0.016 | 0.017 | 10 |
| 3 | 0.09 | 0.24 | 0.54 | 0.016 | 0.016 | 12 |
| 5 | 0.08 | 0.29 | 0.53 | 0.017 | 0.014 | 15 |

That is to say, the percent of S in the deposited metal of the electrode for which this flux was used was reduced and, in the microscopic test, there were few non-metallic inclusions. Especially there was an effect that $Al_2O_3$ and eutectic inclusions definitely decreased. It is especially noted that the Charpy values at low temperatures were high.

Next, the deposited metal welded with a basic coated electrode in which was mixed 7% of the alloy of the present invention and using a hard facing electrode had hardness and graphite microstructure characteristics as set forth in the following table.

| C, Percent | Si, Percent | Mn, Percent | Rc Hardness | Micro-Structure |
|---|---|---|---|---|
| 1.2 | 1.1 | 0.75 | 41–44 | Sorbite+Graphite |

This is important for the new deposit of metals.

The above is an example of the R-Ca-Si-Fe alloy containing rare earth metals. We also produced and experimented on not only the above alloy but also such ferro-alloys containing rare earth metals as an R-Fe-Si alloy (R of 16 wt. percent and Fe of 45 wt. percent, the balance being Si) and an R-Mn-Fe alloy (R of 10 wt. percent and Fe of 22 wt. percent, the balance being Mn).

Such alloys, too, have melting points higher than 1100° C. and can be powdered. It was confirmed that it was effective to add a small amount of such powder to the flux.

That is to say, the deposited metal made by making an alloy of 16% R and 45% Fe, the balance being Si, and adding 2% of it to a rutile series flux had characteristics as set forth in the following and its Charpy value and elongation were favorable.

| Addition of ferro-alloy prepared by the present invention in wt. percent | Tensile strength in kg./mm.² | Elongation in percent | Charpy values in kg. m./cm.² | C, percent | Si, percent | Mn, percent |
|---|---|---|---|---|---|---|
| 0 | 51.5 | 17.4 | 12.3 | 0.08 | 0.33 | 0.65 |
| .2 | 48.2 | 19.6 | 14.5 | 0.09 | 0.38 | 0.66 |

Further, even in the comparison of the deposited metal in the case of applying weld metal to 18/8 stainless steel by means of a stainless steel electrode coated with a lime-titanium oxide flux in which was mixed 3% of this alloy, there was the following difference as compared with the flux to which no alloy was added. The rate of elongation was favorable.

| Addition of ferro-alloy prepared by the present invention in wt. percent | Tensile strength in kg./mm.² | Elongation in percent |
|---|---|---|
| 0 | 68.5 | 34.1 |
| 3 | 66.4 | 36.5 |

As the last example there was shown the following difference between a high carbon steel, to which a small amount of the R-Ca-Si-Fe alloy (R of 30 wt. percent) prepared according to this invention, was added and a high carbon steel, to which no alloy was added, and when 0.3% of this alloy was added, graphite steel was obtained directly by casting.

| Addition of ferro-alloy prepared by the present invention in wt. percent | C, percent | Si, percent | Mn, percent | R, percent | HB | Micro-Structure |
|---|---|---|---|---|---|---|
| 0 | 1.5 | 1.0 | 0.80 | 0.00 | 380 | Cementite+Pearlite. |
| 0.3 | 1.5 | 1.1 | 0.81 | 0.02 | 240 | Nodular Graphite+Pearlite. |

Summarizing the above, this invention is a discovery of a new ferro-alloy containing rare earth metals, a very useful additional alloy for making steel and further a discovery that a deposited metal of a good quality is obtained by mixing a small amount of this new ferro-alloy containing rare earth metals in the flux for conventional coated arc electrodes.

The rare earth metal-containing ferro-alloys disclosed in the present invention are the R-Ca-Si-Fe alloy, R-Si-Fe alloy and R-Mn-Fe alloy which are characterized by the properties of stability, being easily pulverized, and having a proper melting point.

I claim:
1. An addition alloy for use in welding and steel making, consisting essentially of 7–45 percent by weight of rare earth metals, 2–25 percent by weight of Ca, 3–15 percent by weight of Fe, and the balance Si and impurities.

2. An addition alloy for use in welding and steel making, consisting essentially of 12–20 percent by weight of Ce, 7–15 percent by weight of La, 8–10 percent by weight of at least one rare earth element taken from the group consisting of Pr, Nd and Sm, 2–25 percent by weight of Ca, 3–15 percent by weight of Fe, and the balance Si and impurities.

3. An addition alloy for use in welding and steel making, consisting essentially of 16 percent by weight of rare earth metals, 45 percent by weight Fe, and the balance Si and impurities.

4. An addition alloy for use in welding and steel making, consisting essentially of 10 percent by weight of rare earth metals, 22 percent by weight Fe, and the balance Mn and impurities.

References Cited by the Examiner

UNITED STATES PATENTS 1,977,278  10/34  Judy _____ 117—205
2,144,200  1/39   Rohn et al.
2,900,490  8/59   Petryck et al. _____ 117—206

FOREIGN PATENTS 108,976  10/39  Australia.
100,236  11/98  Germany.
302,574  10/29  Great Britain.

OTHER REFERENCES

Silverstein et al., "Welding Journal," vol. 38, May 1959, pages 232$_s$–240$_s$.

DAVID L. RECK, *Primary Examiner.*

RICHARD D. NEVIUS, *Examiner.*